(12) United States Patent
Zolnai et al.

(10) Patent No.: US 12,808,818 B2
(45) Date of Patent: Nov. 24, 2026

US012808818B2

(54) METHOD FOR DETERMINING CRYSTAL DEFECT CONCENTRATION LOWER THAN 10 PPM IN SEMICONDUCTOR MATERIALS BASED ON PHOTOMODULATED REFLECTANCE MEASUREMENT

(71) Applicant: SEMILAB ZRT., Budapest (HU)

(72) Inventors: Zsolt Zolnai, Budapest (HU); János Szívós, Budapest (HU); László Balogh, Komárom (HU); József Gallai, Budapest (HU); György Nádudvari, Pilisszentiván (HU)

(73) Assignee: SEMILAB Zrt., Budapest (HU)

( * ) Notice: Subject to any disclaimer, the term of this patent is extended or adjusted under 35 U.S.C. 154(b) by 37 days.

(21) Appl. No.: 18/847,722

(22) PCT Filed: Mar. 14, 2023

(86) PCT No.: PCT/HU2023/050009
§ 371 (c)(1),
(2) Date: Sep. 17, 2024

(87) PCT Pub. No.: WO2023/175362
PCT Pub. Date: Sep. 21, 2023

(65) Prior Publication Data

US 2025/0044239 A1 Feb. 6, 2025

(30) Foreign Application Priority Data

Mar. 18, 2022 (HU) ...................................... 2200082

(51) Int. Cl.
*G01N 21/95* (2006.01)
*G01N 21/17* (2006.01)

(52) U.S. Cl.
CPC ......... *G01N 21/95* (2013.01); *G01N 21/1717* (2013.01); *G01N 2021/1725* (2013.01)

(58) Field of Classification Search
CPC ....... G01N 2021/1725; G01N 21/1717; G01N 21/95; G01N 21/6408
See application file for complete search history.

(56) References Cited

U.S. PATENT DOCUMENTS 4,579,463 A 4/1986 Rosencwaig et al.
6,489,801 B1 12/2002 Borden et al.
(Continued)

FOREIGN PATENT DOCUMENTS

CN 110071410 B * 2/2022 ........... G02F 1/3553
FR 3030787 A1 * 6/2016 .............. G01J 3/027
(Continued)

OTHER PUBLICATIONS

M. P. Halsall, "Photomodulated Reflectivity Measurement of Free-Carrier Dynamics in InGaN/GaN Quantum Wells", Oct. 17, 2018 (Year: 2018).*

(Continued)

*Primary Examiner* — Maurice C Smith
(74) *Attorney, Agent, or Firm* — Fish & Richardson P.C.

(57) ABSTRACT

In case of semiconductor samples, the method enables the determination of the charge carrier lifetime and crystal defect concentration related to the recombination defect centers present in the material based on photomodulated reflection (PMR) measurement operating in the quasi-static modulation frequency range. The defect centers present in the basically single-crystal semiconductor sample (M1) can be of intrinsic or extrinsic origin, typically electrically active de-feet sites created by the implantation of low-mass—$H^+$, $He^+$—high-energy ions, or impurity atoms. e.g., metal contaminants introduced during other technological steps. The method can be used in all cases where the crystal defect concentration is typically in the ppb-ppm range, its depth distribution is almost uniform, and the size of the excitation/analyzing laser spot in the PMR measurement is signifi- (Continued)

Figure 1:
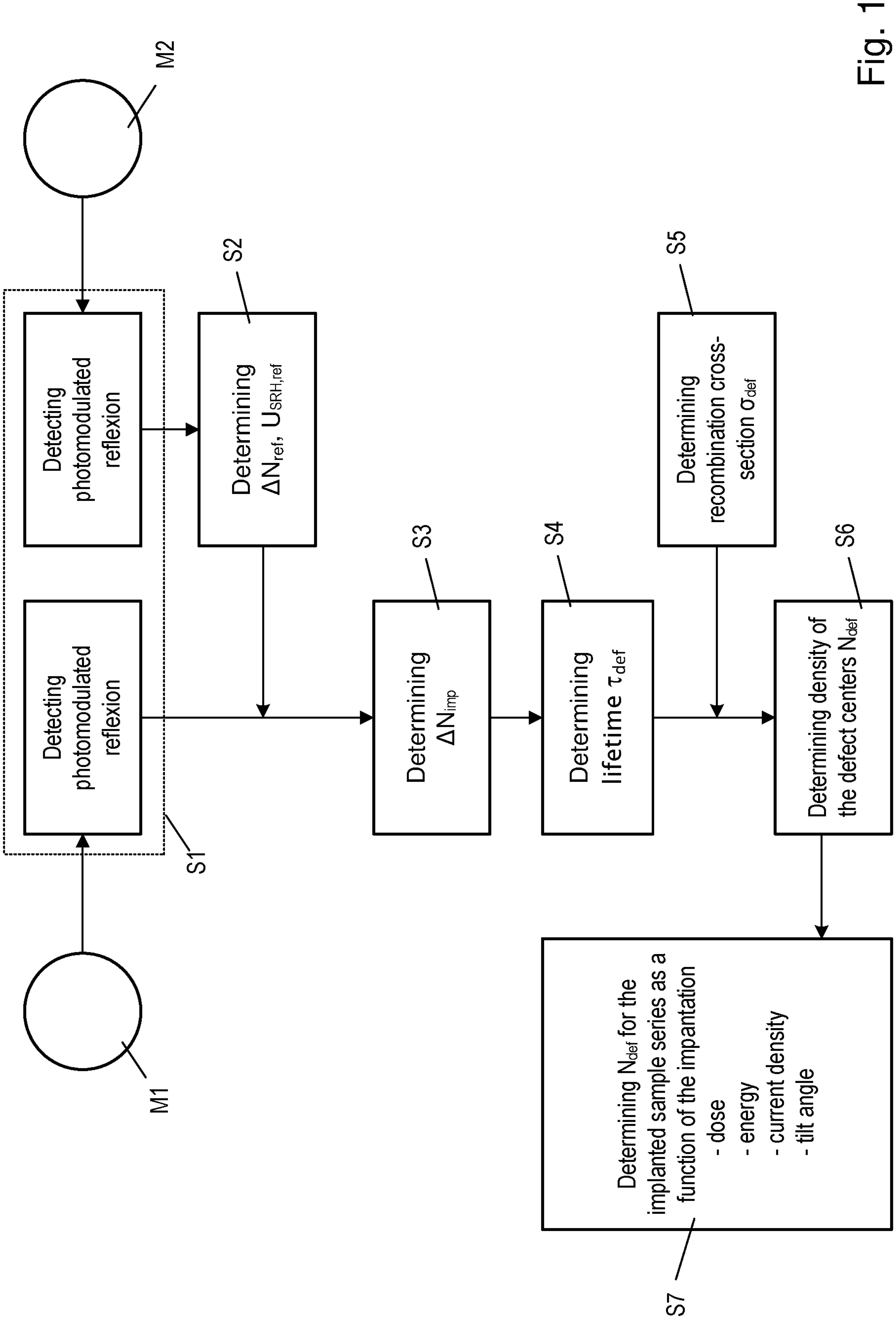

cantly smaller than the thickness of the zone containing the crystal defects. The excess charge carrier concentration obtained from the PMR measurement using the described procedure gives the total lifetime $T_{tot}$, from which, knowing the lifetimes of other charge carrier recombination processes and the time constants of diffusion processes, the life-time and concentration assigned to intrinsic or extrinsic defects can be determined, and can be correlated with the implantation related or other technological parameters.

11 Claims, 4 Drawing Sheets

(56) References Cited

U.S. PATENT DOCUMENTS

| | | | | |
|---|---|---|---|---|
| 6,812,717 B2 | 11/2004 | Borden et al. | | |
| 8,120,776 B1 | 2/2012 | Salnik et al. | | |
| 2006/0166385 A1* | 7/2006 | Salnik | ................ | G01N 21/1717 438/17 |

FOREIGN PATENT DOCUMENTS

| | | | | |
|---|---|---|---|---|
| JP | H01-134240 A | 5/1989 | | |
| JP | H02-089335 A | 3/1990 | | |
| WO | WO-9745747 A1 * | 12/1997 | ............. | G02F 1/353 |
| WO | WO 1999/008307 A1 | 2/1999 | | |

OTHER PUBLICATIONS

Anjum et al., "Thermal wave characterization of silicon implanted with MeV phosphorus ions," Nuclear Instruments and Methods in Physics Research, Section B: Beam Interactions with Materials and Atoms, Apr. 2, 1991, 55(1-4):266-268.
Aspnes et al., "Dielectric functions and optical parameters of Si, Ge, GaP, GaAs, GaSb, InP, InAs, and InSb from 1.5 to 6.0 eV," Physical Review, Jan. 15, 1983, B27(2):985-1009.
David et al., "Generation of defects induced by MeV proton implantation in silicon-Influence of nuclear losses," Nuclear Instruments and Methods in Physics Research, Section B: Beam Interactions with Materials and Atoms, Jan. 21, 2002, 186:209-312.
Dortu et al. "Low frequency modulated optical reflectance for the one-dimensional characterization of ultra-shallow junctions," Thesis for the degree of Doctor of Applied Sciences, Catholic University of Leuven, Faculty of Applied Sciences, Department of Electrical Engineering, May 2009, 340 pages.
Dortu et al. "Progress in the physical modeling of carrier illumination," Journal of Vacuum Science & Technology, May/Jun. 2006, 24(3): 1131-1138.
Hahn et al., "Damage and its rapid thermal annealing kinetics in Ar+ ion implanted Cz silicon," Nuclear Instruments and Methods in Physics Research, 1993, B74:275-278.
Hallen et al., "Multiple proton energy irradiation for improved GTO thyristors," Solid-State Electronics, Feb. 1993, 36(2):133-141.
Hazdra et al., "Local lifetime control by light ion irradiation: impact of blocking capability of power P-i-N diode," Microelectronics Journal, May-Jun. 2001, 32(5-6):449-456.
International Preliminary Report on Patentability in International Appln. No. PCT/HU2023/050009, mailed on Oct. 3, 2024, 9 pages.
International Search Report and Written Opinion in International Appln. No. PCT/HU2023/050009, mailed on Jul. 20, 2023, 11 pages.
Kiepert et al., "Plasma etching and ion implantation on silicon, characterized by laser-modulated optical reflectance," Surface and Coatings Technology, Sep. 1999, 116-119:410-418.
Lei et al., "Electronic transport characterization of B+ ion-implanted silicon wafers with nonlinear photocarrier radiometry," Journal of Applied Physics, Jan. 21, 2020, 127(035701):1-9.
Macdonald et al., "Recombination activity of interstitial iron and other transition metal point defects in *p*- and *n*-type crystalline silicon," Applied Physics Letters, Nov. 1, 2004, 85(18):4061-4063.
Pongracz et al., "Tilt angle and dose rate monitoring of low energy ion implantation processes with photomodulated reflectance measurement," Paper, Presented at 2020 31st Annual SEMI Advanced Semiconductor Manufacturing Conference (ASMC), Saratoga Springs, NY, Aug. 24-26, 2020, 4 pages.
Posselt et al., "Modeling of damage accumulation during ion implantation into single-crystalline silicon," Journal of Electrochemical Society, Apr. 1997, 144(4):1495-1504.
Rougieux et al., "Determining the charge states and capture mechanisms of defects in silicon through accurate recombination analyses: A review," Solar Materials and Solar Cells, Dec. 1, 2018, 187(1):263-272.
Salnick et al., "Noncontact Lifetime Reconstruction in Continuously Inhomogeneous Semiconductors: Generalized Theory and Experimental Photothermal Results for Ion-Implanted Si," Review of Progress in Quantitative Nondestructive Evaluation, 1997, 16:371-378.
Salnick et al., "Quantitative photothermal characterization of ion-implanted layers in Si," Journal of Applied Physics, Mar. 1, 2002, 91(5):2874-2882.
Ujhelyi et al., "Mid-low energy implantation tilt angle monitoring with photomodulated reflectance measurement," Advanced Semiconductor Manufacturing Conference (ASMC), May 6-9, 2019, 5 pages.
Zohta et al., "Shallow donor state produced by proton bombardment of silicon," Japanese Journal of Applied Physics, 1971, 10(4):532-533.
Zolnai et al., "Room temperature micro-photoluminescence measurements for monitoring defects in low-energy high-dose As and B implanted silicon," Advanced Semiconductor Manufacturing Conference (ASMC), May 10-12, 2021, 6 pages.

* cited by examiner

METHOD FOR DETERMINING CRYSTAL DEFECT CONCENTRATION LOWER THAN 10 PPM IN SEMICONDUCTOR MATERIALS BASED ON PHOTOMODULATED REFLECTANCE MEASUREMENT

CLAIM OF PRIORITY

This application is a national stage entry of PCT/HU2023/050009, filed on Mar. 14, 2023, which claims the benefit of Hungarian Application Serial No. P2200082, filed on Mar. 18, 2022. The entire contents of the foregoing are hereby incorporated by reference.

The invention relates to a method for deriving charge carrier lifetime and defect site concentration from photomodulated reflectance measurements in case of low defect concentrations of the order of ppm-ppb in semiconductors, more precisely for determining crystal defect concentrations lower than 10 ppm in semiconductor materials based on photomodulated reflectance measurements.

Photo-Modulated Reflectivity (PMR for short) is a non-destructive, contactless testing technique widely used in semiconductor technology, with which the sample can be examined through an optical principle after a certain technological step at a time, e.g., immediately after ion implantation, before subsequent heat treatment steps.

It is known from previous investigations, for example from the study "Mid-low energy implantation tilt angle monitoring with photo-modulated reflectance measurement" by F. Újhelyi, A. Pongrácz, Á. Kun, J. Szívós, B. Bartal, B. Fodor, A. Bölcskei-Molnár, Gy. Nádudvari, J. Byrnes, and L. M. Rubin (Proc. 30th Annual SEMI Advanced Semiconductor Manufacturing Conference (ASMC), Saratoga Springs, NY, USA, May 6-9, 2019, pp. 1-4), also from the study "Tilt angle and dose rate monitoring of low energy ion implantation processes with photomodulated reflectance measurement" by A. Pongrácz, J. Szívós, F. Újhelyi, Zs Zolnai, Ö. Sepsi, A. Kun, Gy. Nádudvari, J. Byrnes, L. M. Rubin, E. D. Moore (Proc. 31st Annual SEMI Advanced Semiconductor Manufacturing Conference (ASMC), Saratoga Springs, NY, USA, Aug. 24-26, 2020, pp. 1-4) that the measured PMR signal shows high sensitivity to the ion implantation dose, as well as it is known from the study "Room temperature micro-photoluminescence measurements for monitoring defects in low-energy high-dose As and B implanted silicon" by Z. Zolnai, F. Korsós, A. Pongrácz, V. Samu, Z. Kiss, B. Fodor, J. Szivós, L. Rubin, E. Moore, and J. Byrnes (*Proc. 32st Annual SEMI Advanced Semiconductor Manufacturing Conference* (*ASMC*), Saratoga Springs, NY, USA, May 10-12, 2021, pp. 1-4) that the measured PMR signal shows high sensitivity to the current density of the ion implantation, the energy and mass of the implanted ions, and, in case of channeling implantation, to the tilt angle of the ion beam with respect to the crystallographic axis of channeling.

In addition, due to the small sampling area of a few mm$^2$, the PMR is also suitable for high-resolution sample mapping and testing of sample homogeneity after the applied technological steps. Therefore, the technical and theoretical development of this method may be important for semiconductor technology and materials science.

The PMR technique basically measures the change in the reflection of the sample under optical excitation, but this parameter is also related to and provides information about many other physical properties of the material being tested. For example, in the case of shallow and ultra-shallow p-n junctions, the exact depth of the transition can be established, which typically falls in the range below 100 nm, as it is known from the study "Extracting active dopant profile information from carrier illumination power curves" by F. Dortu, T. Clarysse, R. Loo, and W. Vandervorst, (*J. Vac. Sci. Technol., B* 24, p. 375, 2006). The theoretical background of the PMR effect, i.e., the method of calculating the PMR signal in p-type and n-type semiconductors doped in different concentrations have been discussed in detail in the literature, see for example the study "Progress in the physical modeling of carrier illumination" by F. Dortu, T. Clarysse, R. Loo, B. Pawlak, R. Delhougne, and W. Vandervorst, (J. Vac. Sci. Technol., B 24, p. 1131, 2006), or the study "Low frequency modulated optical reflectance for the one-dimensional characterization of ultra-shallow junctions" by F. Dortu (*PHD Thesis, IMEC*, Leuven, Belgium, 2009). In these works, the values of the material parameters related to the PMR effect were also reported in the case of a single-crystal Si sample. The method of deriving the total charge carrier lifetime from the PMR signal was also described, not only for Si, but e.g., also in the case of investigating the free charge carrier dynamics of InGaN/GaN quantum valley structures, see e.g., the studies "Noncontact lifetime reconstruction in countinuously inhomogeneous semiconductors: generalized theory and experimental phototermal result for ion-implanted Si" by A. Salnick, A. Mandelis, A. Othonos, and C. Christofides (*Review of Progress in Quantitative Nondestructive Evaluation*, Vol 16, Edited by D O. Thompson and D. E Chimenti, Plenum Press, New York, 1997, pp. 371-378]) or "Electronic transport characterization of B+ ion-implanted silicon wafers with nonlinear photocarrier radiometry" by X. Lei, B. Li, Q. Sun, J. Wang, and C. Gao (*J. Appl. Phys.* 127, 035701, 2020), or "Photomodulated Reflectivity Measurement of Free-Carrier Dynamics in InGaN/GaN Quantum Wells" by M. P. Halsall, I. F. Crowe, J. Mullins, R. A. Oliver, M. J. Kappers, and C. J. Humphreys (*ACS Photonics* 5:4437-4446, 2018).

Nevertheless, in the tested ion-implanted Si samples, the defect density fell into the relatively high range, typically 0.1-1% or higher, when the PMR effect in the damaged layer is dominated by the thermo-optic effect over the electro-optic effect, and the defect concentration was highly inhomogeneous with depth. On the other hand, ion-implanted and subsequently heat-treated Si samples were examined, where the emerging defect structure and defect concentration profile are less well known, e.g., residual complex defects, and end-of-range (EOR) defects may also be present in the sample. In another study, in the case of InGaN/GaN, the sample had a single-crystal structure with a given doping level and presumably did not contain structural defect sites, which can be created as a result of ion implantation, or by unwanted impurities, e.g., metal impurities that enter the sample during the production or post-processing steps of the raw material used. Therefore, in that work, the presence of such kind of defect sites was not taken into account when evaluating the PMR signal.

Nevertheless, from a semiconductor technological point of view, it is important to know the amount of structural defects in small concentrations of ppm or even ppb and defect sites that can be linked to impurity atoms in order to consider their effect on the electrical properties (charge carrier lifetime).

In this description a method is presented that is a step forward compared to the previous works, which, together with the use of a suitable reference measurement, also takes into account the effect of structural defect sites or contaminant atoms present in a small concentration and nearly homogeneous distribution in the essentially single-crystal sample when evaluating the PMR signals. In these cases, the PMR effect is dominated by the electro-optic effect, and a significant excess charge carrier concentration can be maintained in the sample. By the procedure information can be obtained about the effect of the typically deep levels created by the defect sites in the forbidden bandgap on the lifetime of charge carriers and their concentration. Using the method, the lifetime for the point defects present in the crystal lattice can be derived from the entire effective lifetime value of the charge carriers, after separating other lifetime contributions, such as Schokley-Read-Hall recombination, Auger recombination, and the characteristic time constant contribution from the diffusion of charge carriers.

The defect concentration and specific lifetime values obtained in this way are important parameters from both a technological and material science point of view.

The first publications related to the outlined measurement method are earlier, but from the end of the 80s, in U.S. Pat. No. 4,579,463 or JP H0289335 A. In general, photo-modulated reflectance can be found with this and other names: therma-wave, Modulated Optical Reflectance (MOR), etc. U.S. Pat. No. 6,489,801 B1 lists all the physical characteristics that can influence the measured reflection signal but does not include a qualitative discussion of them.

Several well-known documents discuss the manufacturing technology solutions used during ion implantation procedures, and primarily their monitoring. WO 99/08307 A1 describes the calibration of an ion implanter for a previously measured dose. U.S. Pat. No. 6,812,717 B2, discloses the correspondence of the measured value with the "parameters used to create the measurement", such as an ion-implantation control parameter, or a conclusion about lateral diffusion from a comparison of a specific designed geometry and the distribution of the measured value, and based on this the application of the decision condition "acceptance-rejection" during production.

JP H01134240 A proposes a solution for determining the change in the depth distribution of grid defects on grindings of varying depth, without quantitative determination.

U.S. Pat. No. 8,120,776 B1 describes the determination of the characteristics of an ultra-shallow p-n junction using the DC component of a photomodulated reflectance measurement, where the lattice defect concentration is determined based on a comparison with the DC signals obtained on preliminary reference samples.

With the already mentioned "therma-wave" (TW) technique, the correlation between the TW signal and the implantation dose has been investigated for a long time. For example, S. Hahn et al. have reported also defect concentration measured by deep level transient spectroscopy (DLTS) and the TW signal in heat-treated samples after relatively high-dose, 100 keV Ar+ (dose of $10^{13}$-$10^{15}$ $cm^{-2}$) and 100 keV Si+ (dose of $10^{14}$-$10^{15}$ $cm^{-2}$) near-amorphization/amorphizing implantations. The density of defects in the heat-treated samples was in the ppb range. A qualitative correlation was established, but no defect density was estimated from the TW signal.

M. Anjum et al. examined the effect of energetic $P^+$ implantations of 0.5-3 MeV (dose of $10^{12}$-$10^{14}$ $cm^{-2}$) in a Si sample using the TW technique (see Nucl. Instrum. Methods Phys. Res. B 55 (1991) 266-268). A correlation was found between the dose and the TW signal, and between the tilt angle and the TW signal for channeling implantations at 2-MeV ion energy, but the estimation of the defect concentration was not addressed.

W. Kiepert et al. investigated 100 keV Het (dose of $10^{11}$-$10^{15}$ $cm^{-2}$) implanted Si samples with laser-modulated optical reflectance (*Surface and Coatings Technology* 116-119 (1999) 410-418). Here, the low-energy implantation only affects the upper 1 micron range of the sample, and the resulting defect concentration is in the range of 0.1-1% ppm, which is high from the point of view of the present method. The authors did not discuss the role of defect concentration on the lifetime of the charge carrier when modeling the measured signals.

A. Salnick et al. in their study "Review of Progress in Quantitative Nondestructive Evaluation" (Vol 16, Edited by D O Thompson and D E Chimenti, Plenum Press, New York, 1997, pp. 371-378) 50 keV $P^+$ (dose of $10^{13}$ $cm^{-2}$) investigated implanted Si samples by photo-thermal reflectance (PTR) before and after heat treatment. Their goal was the depth-dependent evaluation of the charge carrier lifetime and diffusion coefficient. The intensity and phase of the measured PTR signals were adjusted by computer simulation as a function of the frequency of the modulation. In the examined implanted samples the defect density can be said to be high, typically 0.1-1%, and the defect concentration is highly inhomogeneous with depth. On the other hand, the defect structure and defect concentration profile that develops in heat-treated samples is less well known, this means, in addition to residual complex defects, end-of-range (EOR) defects may also be present. The authors later repeated the analysis for implantations of 100 keV $B^+$, $P^+$, and $As^+$ in a wide ($10^9$-$10^{15}$ $cm^{-2}$) dose range, see A. Salnick and J. Opsal, *Journal of Applied Physics* 91, 2874, 2002. The shallow defect structure is qualitatively different from the one in the samples we examined. The authors did not evaluate the lifetime for defect states.

X. Lei et al. performed photo-generated charge carrier radiometry (PCR) measurements on 100 keV $B^+$ implanted (dose of $10^{11}$-$10^{16}$ $cm^{-2}$) and heat-treated Si samples and performed an evaluation as a function of the modulation frequency with a similar aim to the previously mentioned Salnick study (*Journal of Applied Physics* 127, 035701 (2020)). Information was obtained on the entire lifetime of charge carriers, but the defect recombination related lifetimes were not evaluated. In similar tests, the highly inhomogeneous sample structure, such as a shallow defect profile, diffusion during heat treatment, the presence of end-of-range (EOR) defects after heat treatment, etc., leads to a more complicated and uncertain evaluation than in the case of the method according to the present invention for the examination of non-heat-treated defect structures with nearly homogeneous distribution extending to great depths.

M. P. Halsall et al. investigated single-crystal, non-implanted InGaN/GaN structures using PMR technique, and the charge carrier lifetime was evaluated as a function of the power of the generating laser, taking into account SRH, Auger, and radiative recombination processes (see *ACS Photonics* 5:4437-4446 (2018)). The presence of structural defects was not considered.

The aim of the invention is to enable to determine a defect recombination related lifetime of charge carriers, which point is missed in the above examples.

The invention is based on the realization that the hitherto largely ignored crystal defect concentration plays an important role in the lifetime of the charge carriers, therefore, when determining the latter, a low crystal defect concentration of the order of ppm-ppb should also be taken into account, which can be carried out advantageously and with reliable results using photomodulated reflectance measurements.

The set task has been solved with a method according to the features of claim 1, for deriving charge carrier lifetime and defect site concentration in semiconductors from photomodulated reflectance measurements in the case of low defect concentrations of the order of ppm-ppb. Some advantageous implementations of the method are listed in dependent claims.

For the monitoring of the implanted dose and charge carrier lifetime with high-precision, application of non-destructive methods is an important factor during manufacturing processes. The method according to the invention, based on PMR analysis, can be used excellently for this purpose. In the case of C-MOS-based imaging electronics, it is equally important to monitor the presence of metal impurities (Fe, Cr, etc.) that deteriorates the stable operation of the device, and their effect on the lifetime of charge carriers in the starting semiconductor base wafer. The described PMR-based method can also be used here in certain impurity concentration ranges.

Figure 2:
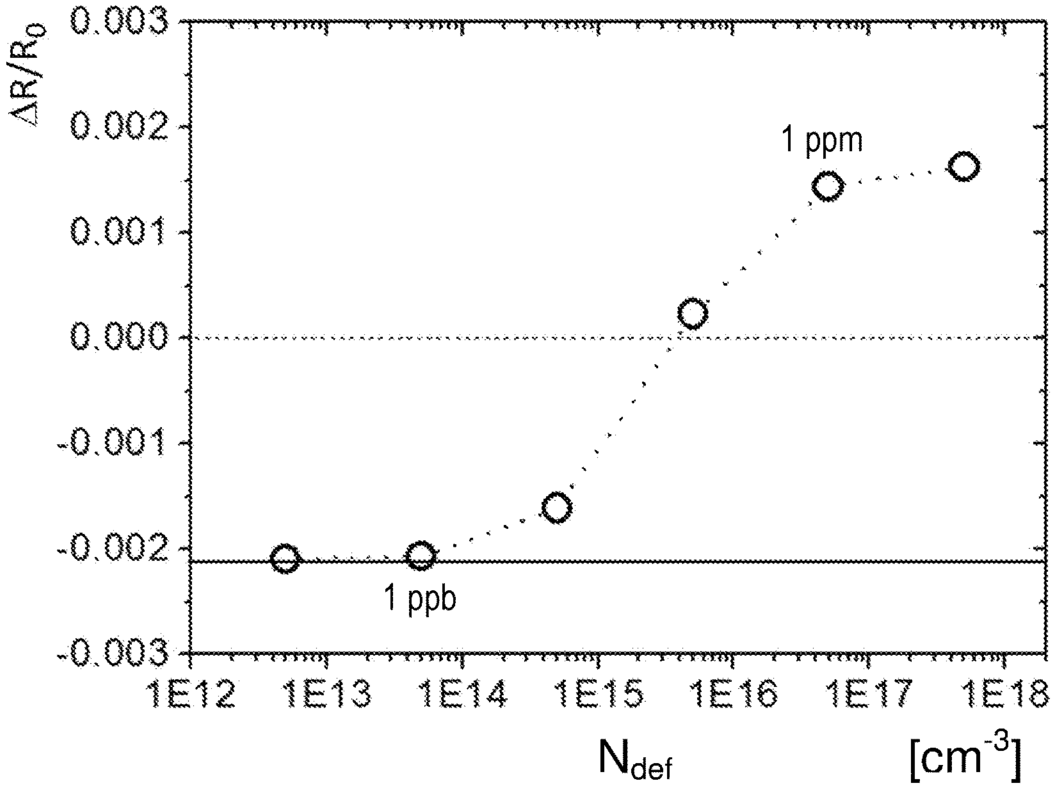
Figure 4:
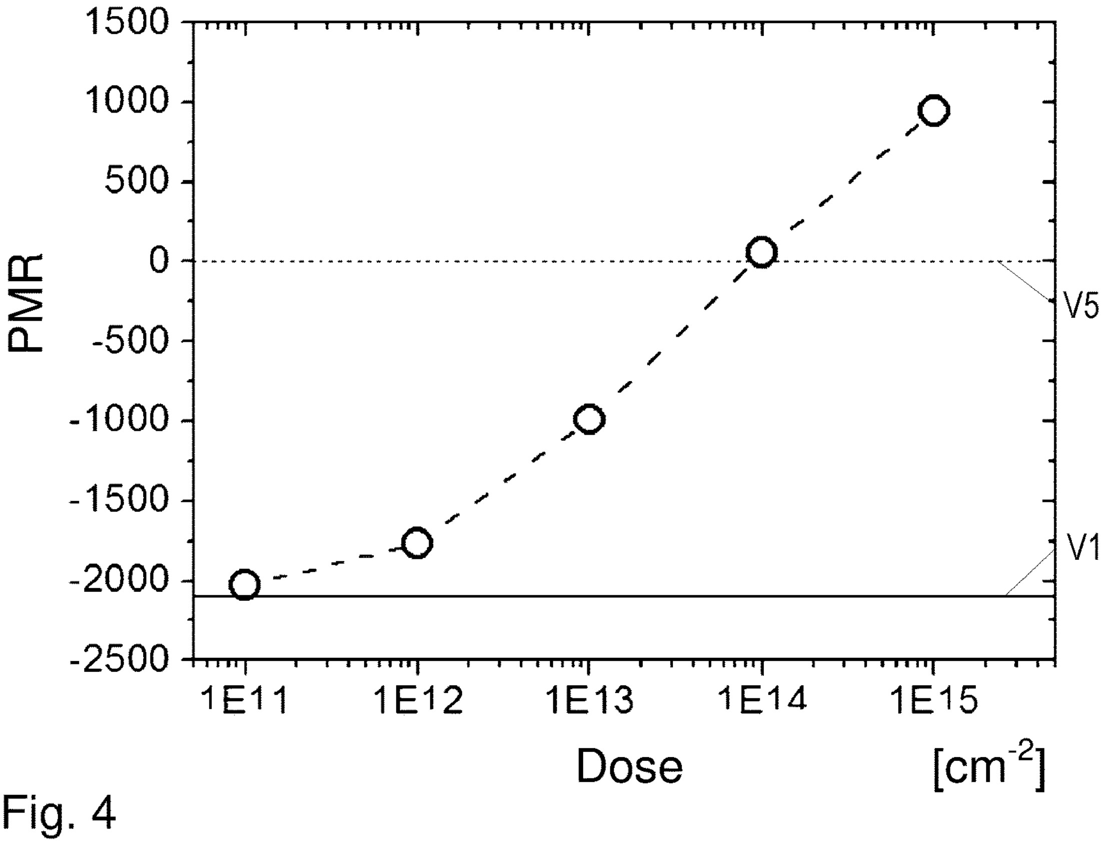
Figure 3A:
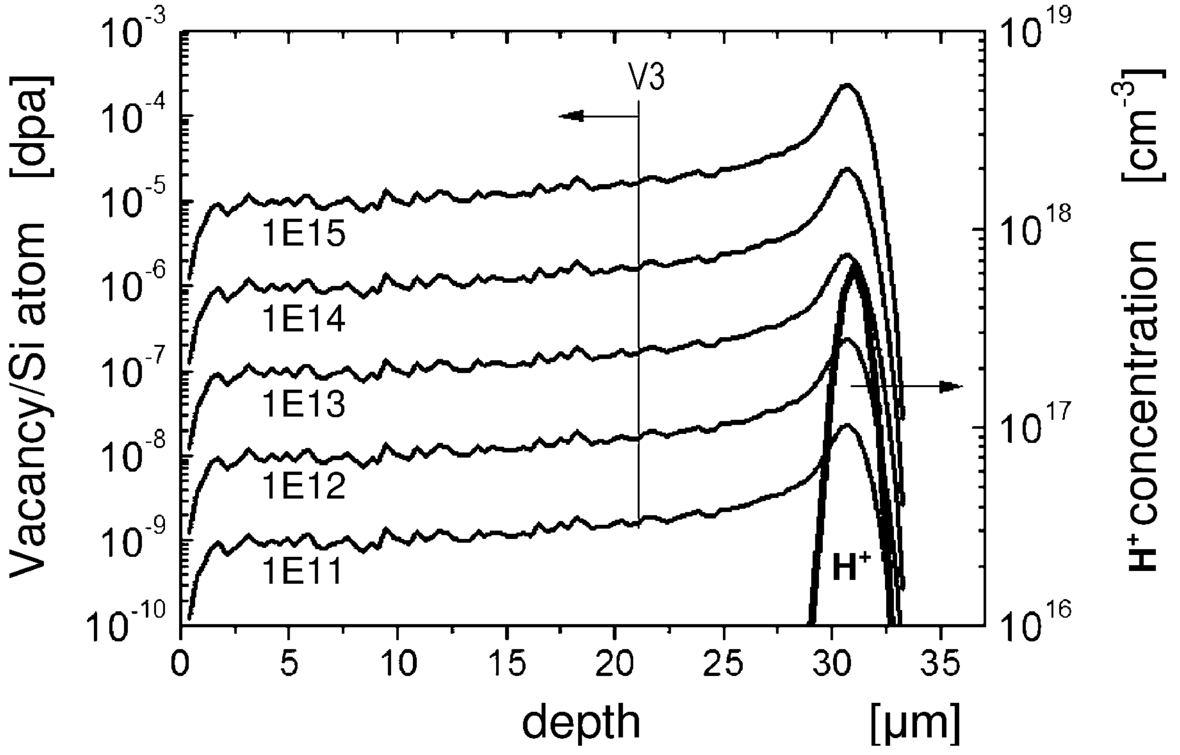
Figure 3B:
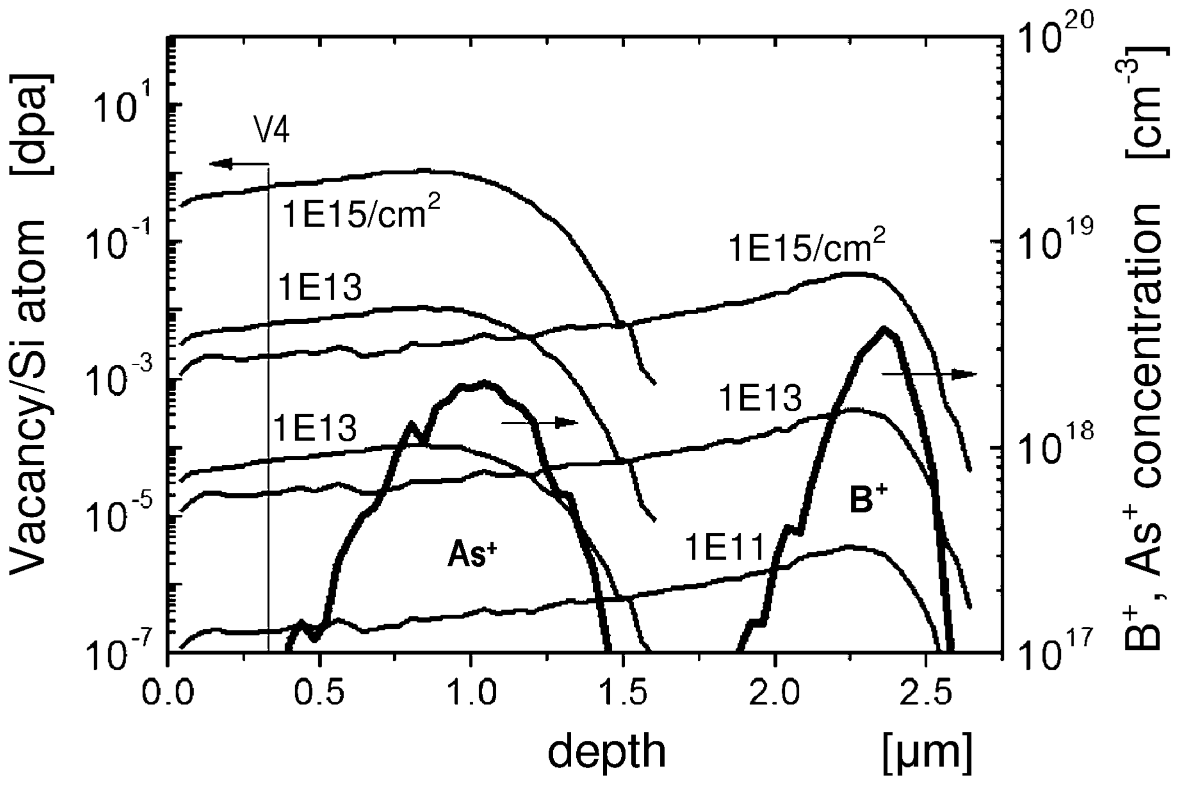
Figure 5:
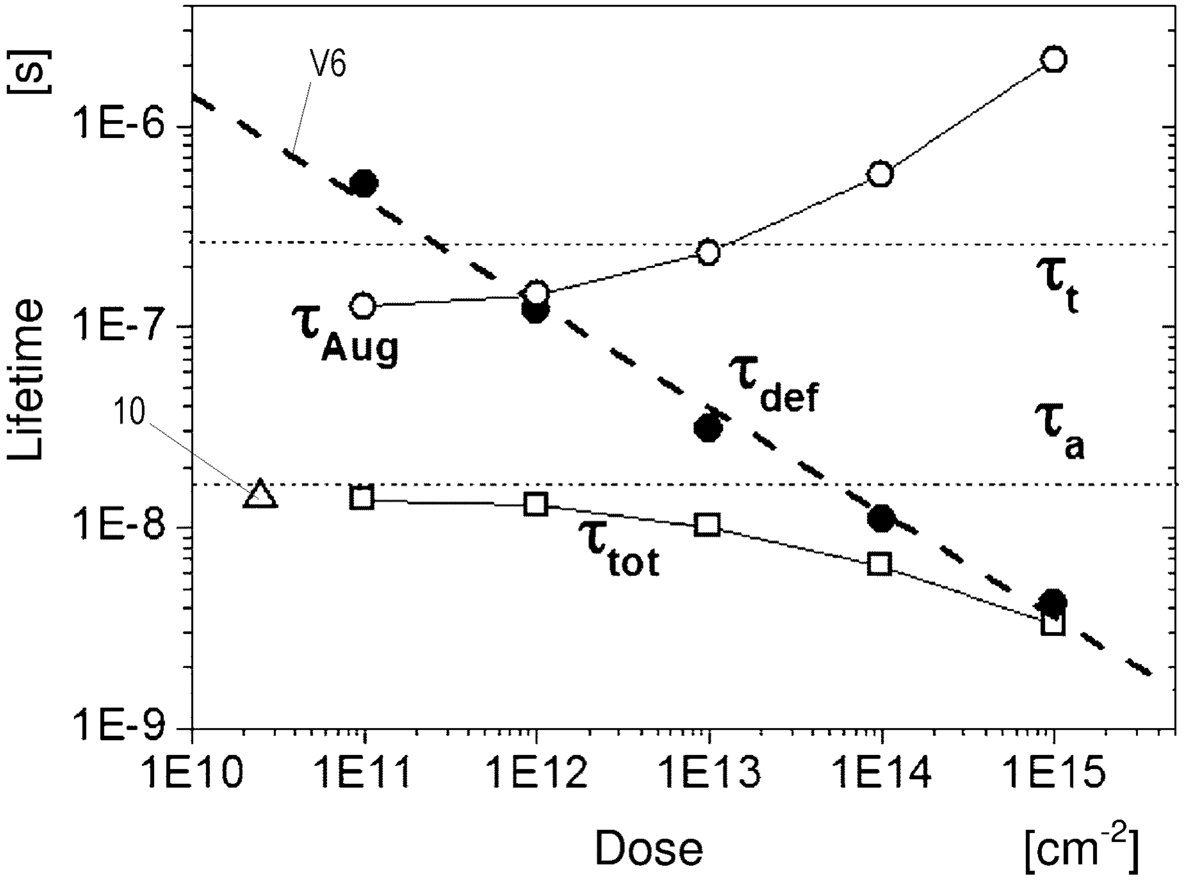

The invention will be described in more detail by means of an implementation example, referring to the accompanying drawings, where FIG. 1 shows a flowchart of a possible implementation of the proposed method for ion-implanted samples, FIG. 2 shows an example of $DR/R_0$ values calculated on lightly doped (~$10^{-15}$ $cm^{-3}$) Si samples containing extra defect sites in different homogeneous concentrations, FIGS. 3*a* and 3*b* show the concentration of vacancy defect centers created by 1.5 MeV hydrogen ion implantation in a single crystal Si sample as a function of depth, FIG. 4 shows the PMR signal measured on Si samples implanted under the conditions shown in FIG. 3 together with the value of the reference measurement, FIG. 5 shows the charge carrier lifetime contributions and the effective diffusion time constants as a function of the implantation dose obtained from the PMR measurement using the presented method.

BRIEF DESCRIPTION OF THE PMR TECHNIQUE

The operating principle of the PMR technique is based on the fact that the complex refractive index of the sample changes as a result of optical excitation. This change—through the change in reflectance—is detected optically.

In the case of PMR, one single-mode laser is used for excitation and another for measuring the change in the reflectance. In the case shown, the wavelength of the excitation laser is 808 nm, while the wavelength of the probing laser is 980 nm. These lasers are attached in one optical fiber and then focused on the sample into a common spot with a diameter of ~3 μm, so excellent spatial resolution can be achieved with the technique. Due to the use of near-infrared wavelengths, the measurement is not only contactless, but also non-destructive.

To detect the PMR induced reflectance change (ΔR), the intensity modulation of the excitation laser incident on the sample is strictly sinusoidal, in our case with a frequency of 2 kHz, while the intensity of the incident measuring laser is kept at a constant value. In the reflected intensity of the probing laser, we look for the Fourier amplitude corresponding to the modulation frequency of 2 kHz with the help of the measurement technique "lock-in". The "raw" PMR signal RawPMR is defined as the quotient of the Fourier amplitude obtained from the reflected signal of the measuring laser—this is the alternating current, i.e., AC component—and the direct current, i.e., DC component of this reflected signal. This ratio actually gives the relative reflectance change: $RawPMR=I^{refl}_{AC}/I^{refl}_{DC}=\Delta R/R$.

In the case of semiconductor materials, the reason for the change in reflectance is the generation of excess charge carriers (electrons and holes) and the creation of a temperature gradient during optical excitation.

When examining ion-implanted semiconductor samples, the PMR signal is also affected by charge carrier concentration changes due to crystal lattice damage created by the implantation process. Therefore, the PMR technique is sensitive to all the parameters of the implantation process, such as the ion mass, ion dose, ion energy, ion current density, and the direction of the ion beam, i.e., its tilt and twist angle, with respect to the main crystallographic axes/planes, in case of channeling implantation, and even to the magnitude of the implantation ion current density. Since the PMR signal usually shows a non-linear dependence, the sensitivity varies from parameter to parameter, and it also changes for different parameter ranges.

In the method according to the invention, the dose dependence of the PMR signal is followed for hydrogen ion implantation with a high-energy of 1.5 MeV. The state-of-the-art knowledge, necessary for the implementation of the method and not fully detailed in this description is known to a person skilled in the art.

FIG. 1 shows a flowchart of a possible implementation of the proposed method in the case of an ion implanted sample M1.

Conditions, Approximations and Parameters Necessary for the Implementation of the Procedure The charge carrier lifetime and concentration that can be assigned to defect locations, as well as the contaminant atom concentration, can be derived from the PMR signal measured in step S1 in the case of the semiconductor sample M1 that meets the following conditions:

(i) Sample M1 is considered to have a basically single-crystal structure, which contains electrically active defect sites in a low ppm-ppb concentration. The defect site can be a defect center created during the implantation of ions with energy of ~1-10 MeV, e.g., in the case of Si, it is typically a vacancy, a divacancy, a dangling bond, or an impurity atom sitting on a substitutional or interstitial lattice site, e.g., metal impurities such as Fe, Cr, Ni, etc. related defect centers. The defect concentration $N_{def}$ is considered to be uniform from the sample surface to the maximum penetration depth $R_p$ of the implanted ions, and within the contaminated depth range. The capture (recombination) cross section of defect sites for free charge carriers is $s_{def}$.

(ii) Due to the low, typically $10^{13}$-$10^{16}$ $cm^{-3}$ defect concentration it is assumed that the crystal lattice basically retains the physical properties characteristic of an undamaged single crystal, and the excess defect sites merely cause local perturbations and basically only affect the lifetime of charge carriers. For this reason, hereinafter, for the material parameters influencing the PMR effect, the values valid for the single-crystal material will be used, assumed that these are known with sufficient accuracy.

(iii) The lateral ambipolar diffusion and thermal diffusion model defined in the described procedure, i.e., the characteristic diffusion times, can be used in the case of a geometry where the radius $R_{las}$ of the excitation and sampling laser spots is significantly smaller than the thickness of the zone containing the defects, in the case of ion implantation, the maximum $R_p$ of the ions penetration depth, i.e., $R_{las} \ll R_p$.

(iv) Due to the low modulation frequency $f_{mod}$ of the excitation laser—$f_{mod}$=2 kHz in the presented case—it is assumed that the changes caused by successive modulation periods in a sample M1 do not overlap in time between adjacent modulation periods. The effect of the modulation is quasi-static, the time constant of the processes taking place in the sample is shorter than $1/f_{mod}$, so the sample M1 has enough time to follow the effects induced by the periodically changing pumping laser power. Note that this condition is fulfilled in the used kHz modulation range, while it can be considered less true e.g., in the MHz frequency range.

The material parameters of the sample M1 used in the process in question, together with their names, are included in the list below. The procedure will be presented later for silicon, so the corresponding material parameters of Si are here also listed:

$R_0$=0.317 is the reflectance of the sample M1 at the wavelength of the sampling laser, $n_0$=3.58 is the refractive index of sample M1 at the wavelength of the sampling laser, $\alpha_{bba}$=945 $cm^{-1}$ is the optical absorption coefficient of sample M1 at the wavelength of the excitation laser, $\beta=-1.2\times10^{-22}$ $cm^{-3}$ is the electro-optic coefficient at the wavelength of the sampling laser, $\delta_T=2.9\times10^{-4}$ $K^{-1}$ is the thermo-optic coefficient at the wavelength of the sampling laser, $m_e^*=0.286\ m_e$ is the effective mass of electrons, $m_h^*=0.36\ m_e$ is the effective mass of holes, $m_e=9.1\times10^{-31}$ kg is the mass of the electron, $D_a$=10 $cm^2s^{-1}$ is the ambipolar diffusion coefficient of excess charge carriers, $D_t=\kappa/\rho C$=0.91 $cm^2s^{-1}$ is the thermal diffusion coefficient of sample M1, $\kappa$=1.5 $Wcm^{-1}K^{-1}$ is the thermal conductivity of sample M1 (at a temperature of 300 K), $\rho$=2.32 g $cm^{-3}$ is the material density of sample M1, C=0.71 $Jg^{-1}K^{-1}$ is the specific heat of sample M1 (at a temperature of 300 K), $A_n=2.8\times10^{-31}$ $cm^6s^{-1}$ is the Auger recombination coefficient for electrons, $A_p=9.9\times10^{-32}$ $cm^6s^{-1}$ is the Auger recombination coefficient for holes, $U_{Aug}$ $(cm^{-3}s^{-1})=A_n(PN^2-NN_{ie}^2)+A_p(NP^2-PN_{ie}^2)$ is the Auger recombination value, $U_{SRH}$ $(cm^{-3}s^{-1})=(PN-N_{ie}^2)/(\tau_P(N+N_{ie})+\tau_N(P+N_{ie})$ is the value of Shockley-Read-Hall (SRH) recombination, $\tau_N=\tau^0_N/(1+(N_a+N_d)/P_{SRH})$, $\tau_P=\tau^0_P/(1+(N_a+N_d)/N_{SRH})$, $\tau^0_N=2\times10^{-3}$ s is the SRH material parameter, $\tau^0_P=2\times10^{-4}$ s is the SRH material parameter, $N_{SRH}=P_{SRH}=5\times10^{16}$ $cm^{-3}$ is the SRH material parameter, $N_{ie}=10^{10}$ $cm^{-3}$ is the intrinsic charge carrier concentration in sample M1, $P_0$ $(cm^{-3})=[(N_a-N_d)+((N_a-N_d)^2+4N_{ie}^2)^{1/2}]/2$ is the equilibrium hole concentration in sample M1, $N_a$ $(cm^{-3})$ is the acceptor dopant concentration in sample M1, $N_d$ $(cm^{-3})$ is the donor dopant concentration in sample M1, $N_0$ $(cm^{-3})=N_{ie}^2/P_0$ is the equilibrium electron concentration in the sample M1, $\Delta N$ $(cm^{-3})$ is the excess electron concentration, $\Delta P$ $(cm^{-3})$ is the excess hole concentration, $N=N_0+\Delta N$ is the total electron concentration, $P=P_0+\Delta P$ is the total hole concentration, $\sigma_{def}$ $(cm^2)$ is the electron capture cross section of dominant defect type in sample M1, $N_{def}$ $(cm^{-3})$ is the density of dominant defect type in sample M1, $v_{th}=(3k_BT/m_e^*)^{1/2}=2.09\times10^7$ cm $s^{-1}$ is the thermal electron velocity in the sample M1 (at a temperature of 300 K), plane x-y is the plane of the sample surface, direction z—is the direction of the normal of the surface of the sample M1 (depth in the sample M1), i.e., the direction of the laser beams.

The PMR technical parameters required for the application of the procedure in question, with the current values for the examples presented later are as follows:

$I_{pump}$ $(Wcm^{-2})$ is the power density of the excitation laser, $R_{las}$=1.5 μm is the radius of the excitation and sampling laser spot, $f_{mod}$=2 kHz is the excitation laser modulation frequency, $\lambda_{pump}$=808 nm is the excitation laser wavelength, $\lambda_{probe}$=980 nm is the sampling laser wavelength.

Analysis of the PMR Signal

The periodically varying pumping laser power (AC excitation component) periodically creates excess charge carriers, electrons, and holes in the sample M1, with maximum concentrations ΔN and ΔP. This causes a periodic change in the refractive index and in the reflectance of the sample M1 (both decreases with ΔN) with a maximum value of |Δn| and |ΔR|. In addition, the sample temperature also changes periodically (increases with ΔN) with a maximum value of ΔT. The PMR signal, i.e., the relative change in reflectance of sample M1, $\Delta R/R_0$, can be calculated as follows, see the already mentioned study "Progress in the physical modeling of carrier illumination" by F. Dortu, T. Clarysse, R. Loo, B. Pawlak, R. Delhougne, and W. Vandervorst:

$$\Delta R/R_0=\left[4/\left(1-n_0^2\right)\right]\left\{\beta\left\{\Delta N/m_e^*+\Delta P/m_h^*\right)+\delta_T\Delta T\right\}+\left[4/\left(1-n_0^2\right)\right]\left\{\beta\int_{0^\infty}\cos\left(4\pi n_0 z/\lambda_{probe}\right)\left[\left(d\Delta N/dz\right)/m_e^*+\left(d\Delta P/dz\right)/m_h^*\right]dz+\delta_T\int_{0^\infty}\cos\left(4\pi n_0 z/\lambda_{probe}\right)\left(d\Delta T/dz\right)dz\right\} \quad (1)$$

$n_0$, $R_0$, β and $\delta_T$ are the refractive index, reflection coefficient, electro-optic and thermo-optic coefficient of the sample M1 at the wavelength $\lambda_{probe}$ of the sampling laser; $m_e^*$ and $m_h^*$ are the effective masses of electrons and holes. These material parameters are known with high accuracy for the laser wavelengths generally used in the case of single-crystal Si, e.g. in case of $\lambda_{probe}$=980 nm, these parameters are: n=3.58, $R_0$=0.317, $\beta=-1.2\times10^{-22}$ and $\beta_T=2.9\times10^{-4}$ $K^{-1}$ (see F. Dortu, T. Clarysse, R. Loo, B. Pawlak, R. Delhougne, and W. Vandervorst: "Progress in the physical modeling of carrier illumination", J. Vac. Sci. Technol., B 24, p. 1131 (2006)), and $m_e^*$=0.286 and $m_h^*$=0.36, respectively.

The second and third terms on the right-hand side of equation (1) contain the gradients of the quantities ΔN, ΔP and ΔT perpendicular to the plane of the sample M1 in the z-direction, and the intensities of the sampling laser beam components reflected from the z-depth due to the refractive index gradient are summed up considering their phases. It will be shown below that in this case the values of these terms comprising the integrals are negligible compared to the first term.

Knowing ΔN, ΔP and ΔT, the value of the measured PMR signal, i.e., $\Delta R/R_0$ can be calculated based on the first term on the right-hand side of equation (1). Due to the high power density of the excitation laser $\Delta N=\Delta P$, where it is assumed that the generated excess charge carrier concentrations are significantly higher than the basic doping level of the semiconductor sample. In the example presented later, this condition is fulfilled.

(i) The defect concentration is assumed to be constant with depth on the wavelength scale of the sampling laser.

(ii) Due to the decreasing intensity of the excitation laser with depth $I_{pump}(z)=I_{pump}(0)\exp(-\alpha_{bbs}z)$ in case of initially depth-dependent profiles ΔN (z) and ΔP (z), the vertical (z-direction) charge carrier diffusion can be neglected due to the relatively short total effective charge carrier lifetime $\tau_{tot}$, since $(D_a\tau_{tot})^{1/2}<<R_p$. Here, $D_a$ is the ambipolar diffusion coefficient of the charge carriers, the value of which is $D_a\sim10\ cm^2s^{-1}$, and $R_p$ is the maximum penetration depth of the ions.

(iii) Analogously, for the initially depth-dependent temperature profile, T (z), the vertical (z-direction) thermal diffusion can be neglected due to the relatively short effective lateral thermal diffusion time constant $\tau_{tot}$, since $(D_t\tau_t)^{1/2}<<R_p$, where $D_t\sim1\ cm^2s^{-1}$ is the lateral thermal diffusion coefficient. Here, $D_t=\kappa/\rho C$, where $\kappa=1.5\ W\ cm^{-1}K^{-1}$, $\rho=2.32\ g\ cm^{-3}$, és $C=0.71\ Jg^{-1}K^{-1}$ are the thermal conductivity, density, and specific heat of the Si crystal.

FIG. 2 shows an example of $\Delta R/R_0$ values calculated on slightly doped ($\sim10^{-15}\ cm^{-3}$) Si samples M1 containing extra defect sites in different homogeneous concentrations. The $\Delta R/R_0$ value of a defect-free reference Si sample M2 is also indicated. The $\Delta R/R_0$ value of the defect-free reference Si sample M2 is shown by a thick horizontal line V1. The zero-value reflection change is marked with a dashed line V2. The calculation refers to an excitation laser wavelength $\lambda_{pump}=808$ nm, an excitation laser power $P_{las}=40$ mW and a circular laser spot of a diameter of 3 μm. The electron capture cross-section of the defect sites is $\sigma_{def}=3\times10^{-15}\ cm^2$. The calculations were made on the basis of equations (14), (15) with the material parameters indicated in the conditions necessary for the implementation of the procedure. Even at a defect concentration of 1 ppb, there is a visible difference compared to the reference sample M2 then the reflectance change is significant in the ppb-ppm range, so the PMR method can be beneficially used to determine the defect concentration and the lifetime assigned to it, via a measurement on a suitable reference sample M2. It should be noted that at defect concentrations below~0.1 ppm, the electro-optic effect dominates over the thermo-optic effect, in which case a significant excess charge carrier concentration can be maintained in the sample M1, and the PMR signal shows a negative value.

FIG. 3*a* shows the simulation of vacancy concentration as a function of depth in the case of a Si sample M1 implanted with 1.5 MeV $H^+$ ions at different doses ($10^{11}$-$10^{15}\ cm^{-2}$). The simulation was made with the widespread computer program SRIM (see SRIM: Stopping and Range of Ions in Matter, www.srim.org), with conventionally fixed material parameters for Si: an atomic displacement threshold energy of 15 eV, and a density of $2.32\ gcm^{-3}$. The vacancy profiles were corrected with a defect survival probability of Cacc=0.1, in order to take into account the intensive vacancy recombination processes taking place in the rare collision cascades caused by the implanted light $H^+$ ions. It can be seen that the defect concentration hardly changes as a function of depth, so it is considered homogeneous in the evaluation procedure applied to PMR analysis. The vacancy concentration increases linearly with the implantation dose, and it varies approx. in the range of 1 ppb to 10 ppm. The implanted hydrogen concentration profile for a dose of $10^{14}\ cm^{-2}$ is indicated by a line V3. The penetration depth of the ions is Rp~30 microns, hydrogen is concentrated in the vicinity of $R_p$.

FIG. 3*b* shows the SRIM simulation of vacancy concentration as a function of depth in the case of a Si sample M1 implanted with 1.5 MeV $B^+$ and $As^+$ ions at different doses ($10^{11}$-$10^{15}\ cm^{-2}$). It can be seen that the penetration depth of the ions is much smaller than with hydrogen irradiation, respectively, while the vacancy concentration is for boron and arsenic irradiation two and five orders of magnitude higher than for hydrogen implantation with a similar dose, as indicated by a line V4.

FIG. 4 shows the measured PMR signal for a slightly B-doped (~$10^{15}\ cm^{-3}$) p-type Si sample M1 implanted with 1.5 MeV $H^+$ ions at five different doses ($10^{11}$-$10^{15}\ cm^{-2}$). Signal magnitude is: PMR signal$=10^6\times\Delta R/R_0$. Measurement parameters are: excitation red laser wavelength $\lambda_{pump}=808$ nm, excitation red laser power $P_{pump}=40$ mW, modulation frequency $f_{mod}=2$ kHz, sampling infrared laser wavelength and power $\lambda_{probe}=980$ nm, $P_{probe}=20$ mW. The diameter of the laser spots is 3 μm. The zero-reflection change is marked with a dashed line V5. The PMR signal is quite sensitive in the range of ppb-ppm defect concentrations estimated from the SRIM simulation, and it changes almost linearly on the logarithmic dose scale and changes sign around a dose of $10^{14}\ cm^{-2}$. The experimental values $\Delta R/R_0$ show good agreement with the values calculated according to the procedure presented in FIG. 1, however, the slope of the measured curve is almost constant and smaller than the calculated one. The possible reason for this is explained in connection with FIG. 5.

FIG. 5 shows the charge carrier lifetimes evaluated using the described method from the PMR measurements shown in FIG. 4 in the case of the Si sample M1 implanted with 1.5 MeV $H^+$ ions at five different doses ($10^{11}$-$10^{15}\ cm^{-2}$). A triangle 10 shows the value for the reference, non-implanted Si sample M2. The diagram shows the total lifetime $\tau_{tot}$, the lifetime $\tau_{Aug}$ of Auger recombination and the lifetime $\tau_{def}$ determined in step S4 of recombination at implantation-induced defect sites as a function of dose. The horizontal dotted lines $\tau_a$ and $\tau_t$ show the characteristic time constant of ambipolar charge carrier diffusion and thermal diffusion. It can be seen that at lower doses the entire effective lifetime is determined by ambipolar diffusion, while the role of Auger recombination is relatively small on the entire dose scale. As the dose and defect concentration increase, the recombination lifetime $\tau_{def}$ gradually takes over the determining role, because while at the lowest dose the lifetime $\tau_{def}$ falls on the magnitude scale of ~μs, at the middle dose it already approaches the value belonging to the line $\tau_a$, and it is almost an order of magnitude smaller at the largest dose. Here, practically the total effective lifetime is equal to the lifetime value $\tau_{def}$. The slope of the dashed line V6 is −½, so $\tau_{def}$ shows an inverse square root dependence with the dose, i.e., the effective defect concentration ($N_{def}$) depends on the square root of the dose. This suggests a sublinear dose dependence of $N_{def}$. One reason for this may be the dynamic heat treatment and recombination of the created Si vacancies and interstitials during implantation, which may become more intense as the defect concentration increases. On the other hand, the diffusion of implanted hydrogen atoms facilitated by implantation can also lead to the creation of hydrogen-defect site complexes and the passivation effect of hydrogen atoms bound to defect sites, which can result in a sublinear dose dependence of $\tau_{def}$. Thus, the PMR measurement can also provide information about the dynamic heat treatment and in-situ defect recombination processes taking place during implantation. In the ppb-ppm defect concentration range, few measuring methods can be used that provide similar quantitative information. In addition, the advantage of PMR is that it is a non-destructive and contactless method. The reliability of the evaluation of $\tau_{def}$ and $N_{def}$ with the described method is supported also by the fact that for 1.5 MeV $H^+$ implantation, others also found a similar square root relationship between the dose and the effective defect concentration based on microwave photoconduction transient (MW-PCD) measurements, see for example the study "In situ analysis of the carrier lifetime in silicon during implantation of 1.5 MeV protons" of E. Gaubas et. al (*Lithuanian Journal of Physics,* 50 (4): pp. 427-433, 2010).

Electro-Optic Effect, Generation of Additional Charge Carriers

The excess charge-carrying generation rate of the excitation (pumping) laser operating at the optical frequency $\nu_{pump}$ and illuminating the sample M1 with a power density $I_{pump}$, with a laterally (r) Gaussian intensity distribution profile can be determined as a function of the z-direction (in depth) of the sample M1 according to the following equation:

$$G_{pump}(z)=\left(I_{pump}/h\nu_{pump}\right)\exp\left(-r^2/R_{las}^2\right)(1-R_0)\alpha_{bba}\exp(-\alpha_{bba}z) \tag{2}$$

where $R_{las}$ is the characteristic radius of the laser spot, $\alpha_{bba}$ is the absorption coefficient belonging to the band-to-band electron transition of the sample M1, its value is $\alpha_{bba}$=945 $cm^{-1}$ for $\alpha_{bba}$=808 nm. Knowing $R_{las}$ and $\alpha_{bba}$, the value of $G_{pump}$ can be determined, an example can be found in a study of D. E. Aspnes and A. A. Studna (*Phys. Rev. B* 27:985-1009 (1983)).

The time derivative of the excess charge carrier concentration $\Delta N$ is:

$$d\Delta N/dt=G_{pump}-\Delta N(t)/\tau_{tot}) \tag{3}$$

Solving equation (3) results:

$$\Delta N(t)=G_{pump}\tau_{tot}\left(1-\exp\left(-t/\tau_{tot}\right)\right) \tag{4}$$

Here, $\tau_{tot}$ is the total effective characteristic lifetime of the excess charge carriers, which includes the effects of recombination and charge carrier diffusion, meaning the characteristic time during which the charge carrier disappears through recombination process or lateral diffusion, i.e., in the x-y plane from the area below the monitoring laser spot. As it will be apparent, in the examined cases $\tau_{tot}$ typically falls in the range of ~$10^8$-$10^9$ s. Since $\tau_{tot}$<<1/fmoc, the equation (4) can be further simplified:

$$\Delta N(\tau_{tot})=G_{pump}\tau_{tot} \tag{5}$$

According to this, $\Delta N$ promptly follows the modulation of $G_{pump}$ in time, i.e., the quasi-static condition can be fulfilled. $\tau_{tot}$ can be calculated using the following formula:

$$\tau_{tot}=\left(\tau_{SRH}^{-1}+\tau_{Aug}^{-1}+\tau_{def}^{-1}+\tau_a^{-1}\right)^{-1} \tag{6}$$

where $\tau_{SRH}$, $\tau_{Aug}$ and $\tau_{def}$ are the lifetimes of Shockley-Read-Hall (SRH), Auger and charge carrier recombination at defect sites, and t, is the characteristic time constant of lateral ambipolar charge carrier diffusion, characterizing the temporal lateral spread of the charge package $\Delta N$ (x,y) induced by the generation rate $\Delta G(x,y)\sim\exp(-(x^2+y^2)/R_{las}^2)=\exp(-(r^2)/R_{las}^2)$ having a two-dimensional Gaussian character. Its value can be estimated on the basis of $t_a=(eR_{las})^2/D_a$, and it can be specified by evaluating the measurements on the reference, i.e., non-implanted or clean, samples M2 that do not contain additional structural defects or unintentional impurities as recombination centers, respectively.

One of the keys to the method according to the invention lies in the expression of equation (6), where the terms $\tau_{def}$ and $\tau_a$ are introduced in the calculation of $\tau_{tot}$ as they were not included in this form, as far as we know, in previous discussions of the interpretation of the PMR signal.

Returning to the integral of equation (1) containing the gradient $d\Delta N/dz$, based on the equation (5), it can be seen:

$$d\Delta N/dz=\tau_{tot}\left(dG_{pump}/dz\right)=-\tau_{tot}\alpha_{bba}G_0\exp(-\alpha_{bba}z) \tag{7}$$

Here, $\tau_{tot}$ is typically ~$10^{-8}$ s (see FIG. 4), and Go is the maximum of the charge carrier generation rate at the surface of the sample M1. By substituting equation (7) into the corresponding integral term of equation (1), the value $\Delta N$~$10^{15}$ $cm^{-3}$ is obtained after integration, which is negligible compared to the first term of equation (1) (typically $\Delta N$~$10^{18}$ $cm^{-3}$), so in the estimation of the PMR signal the gradient term can be omitted.

The relationship between the charge carrier lifetime $\tau_j$ belonging to a given recombination channel and the recombination coefficient $U_j$ that can be assigned to the same channel is:

$$\Delta N/U_j=\tau_j \tag{8}$$

The value of $U_j$ can be calculated in a well-known manner for the Auger and SRH processes and can be found in several sources in the referenced literature, these terms have already been detailed before, in the description of the conditions and parameters necessary for the operation of the procedure. It is important to note that both $U_{Aug}$ and $U_{SRH}$ depend on $\Delta N$ and $\Delta P$. It is emphasized that in the case of the conditions during the PMR measurement (relatively high $\Delta N$, $\Delta P$ values), SRH recombination is negligible compared to Auger recombination.

For the defect centers to be examined $\Delta N/U_{def}=\tau_{def}$, where $U_{def}=\sigma_{def}N_{def}\Delta N v_{th}$, where $\sigma_{def}$ and $N_{def}$ determined in steps S5 and S6 are the recombination cross-section and density of the defect centers, and Vth is the thermal velocity of the charge carriers at room temperature. Thus, knowing $\tau_{def}$, $L_{def}=(\sigma_{def}N_{def})^{-1}$, the characteristic path length assigned to defect recombination can be determined, and knowing $\sigma_{def}$, also the value of $N_{def}$ can be obtained in step S7. Data on the value of $\sigma_{def}$ can be found in the literature, e.g., in the study by M.-L. David, E. Oliviero, C. Blanchard, J. F. Barbot (*Nucl. Instr. Meth. Phys. Res. B* 186:309-312, 2002) for Si, $\sigma_{def}$=1-5×$10^{-15}$ $cm^2$ in case of divacancies and $\sigma_{def}$=1-11×10$^{-15}$ cm$^2$ for centers linked to vacancies. For interstitial metal impurities in Si, the electron capture cross sections are $\sigma_{def}$=5×10$^{-14}$ cm$^2$ for Fe, $\sigma_{def}$=2.3×10$^{-13}$ cm$^2$ for Cr and $\sigma_{def}$=5×10$^{-14}$ cm$^2$ for V as it is known from a study by D. Macdonald and L. J. Geerligs (*Appl. Phys. Lett.* 85 (18): 4061, 2004). A useful summary of the $\sigma_{def}$ values of different defect centers in silicon can be found in a study by F. E. Rougieux, C. Sun, D Macdonald (*Solar Energy Materials and Solar Cells,* 187:263-272 (2018)).

Thermo-Optic Effect, Temperature Increase in Sample M1

The excess free electrons produced by the excitation laser move from the valence band to the conduction band, and then-since the energy of the excitation laser ($h\nu_{pump}$=1.53 eV) is greater than the bandgap of Si ($E_{gap}$=1.12 eV)—the extra excess energy is delivered to the lattice via phonons, while their energy decreases from the excited state to a level corresponding to the minimum of the conduction band. This relaxation takes place very quickly, on a time scale of 10$^{-12}$ s and is accompanied by prompt heat release ($H_{hc}$, "hot electron" or "hot hole" heat source term) and temperature rise. Excess charge carriers relaxing from the minimum of the conduction band through electron-hole pair recombination—due to the indirect band gap of Si—release the energy corresponding to the band gap almost entirely in the form of heat ($H_{rec}$, recombination heat source term). Recombination can occur via SRH and Auger processes or via defect sites. This further increases the temperature of the Si crystal. A higher temperature increases the refractive index through the thermo-optic effect, thus creating an opposite effect to the electro-optic effect, which basically lowers it. The heat source members $H_{hc}$ and $H_{rec}$ and then the temperature increase $\Delta T$ are calculated as follows:

$$H_{hc} = G_{pump}(h\nu_{pump} - E_{gap}) \tag{9}$$

$$H_{rec} = (U_{Aug} + U_{SRH} + U_{def})E_{gap} \tag{10}$$

$$\Delta T = (H_{hc} + H_{rec})\tau_t/\rho C) \tag{11}$$

Here, $\tau_t$ is the characteristic time constant of the lateral thermal diffusion, which characterizes the lateral spread over time of the temperature profile $\Delta T(x,y) \sim \exp(-(x^2+y^2)/R_{las}^2)$ with two-dimensional Gaussian characteristic. Its value can be estimated based on $\tau_t=(eR_{las})^2/D_t$, and it can be specified by evaluating the measurements on the reference, i.e., non-implanted, or clean, sample M2 that do not contain additional structural defects or unintentional impurities as recombination centers, respectively. Knowing $\Delta N$ in equations (9)-(11), the values of all parameters except $U_{def}$ can be considered known, and the value of $\Delta T$ can be estimated as a function of $U_{def}$. In the case of the reference (undamaged or clean) sample M2, $U_{def}$=0.

Returning to the integral of equation (1) containing the $d\Delta T/dz$ gradient, and considering that:

$$dU_{Aug}/dz = (dU_{Aug}/d\Delta N)(d\Delta N/dz) \approx 3(A_n + A_p)\Delta N^2(d\Delta N/dz) \tag{12}$$

$$dU_{def}/dz = (dU_{def}/d\Delta N)(d\Delta N/dz) = (\sigma_{def}N_{def}v_{th})(d\Delta N/dz) \tag{13}$$

and using the in equation (7) already described form of $d\Delta N/dz$ and $dG_{pump}/dz$, the integral can be calculated. Its value in the range of ppb-ppm defect concentrations is ~0.003-0.2° C. This is negligible compared to the value of the main term, $\Delta T$, which typically falls in the range of ~1-10° C. for similar $N_{def}$ values and determines the thermo-optic effect.

Procedure for Evaluating the PMR Signal

Using the results of the above analysis, the PMR signal in the reference sample M2 free of defect centers can be calculated with the following equation:

$$\Delta R/R_0|_{ref} = |4/(1-n_0^2)|\{\beta\Delta N_{ref}(1/m_e^* + 1/m_h^*) + \delta_T(G_{pump}(h\nu_{pump} - E_{gap}) + (U_{SRH,ref} + U_{Aug,ref})E_{gap})\tau_t/\rho C\} \tag{14}$$

Here, $U_{SRH,ref}$ and $U_{Aug,ref}$ depend on the first and third powers of $\Delta N$, and $\Delta R/R_0$ can be calculated for all values of $\Delta N$. From the experimentally determined value $\Delta R/R_0|_{ref}$, the value of $\Delta N_{ref}$ can be determined in step S2 based on equation (14), then from this result the values of $U_{SRH,ref}$ and $U_{Aug,ref}$ can be determined.

The PMR signal in the sample M1 implanted in this example comprising the defect centers can be calculated using the following expression:

$$\Delta R/R_0|_{imp} = |4/(1-n_0^2)|\{\beta\Delta N_{imp}(1/m_e^* + 1/m_h^*) + \delta_T(G_{pump}(h\nu_{pump} - E_{gap}) + (U_{SRH,imp} + U_{Aug,imp} + U_{def})E_{gap})\tau_t/\rho C\} \tag{15}$$

In order to obtain the value of $\Delta N_{imp}$ from the experimentally determined value of $\Delta R/R_0|_{imp}$ using equation (15), in step S3 for the damaged (implanted) sample M1, an additional consideration is needed. For the reference sample M2, $\Delta N_{ref}=G_{pump}\tau_{ref}$, where $\tau_{ref}$ is the total effective lifetime of the charge carriers. At the same time, in the damaged (implanted) sample M1, $\Delta N_{imp}=G_{pump}\tau_{imp}$, where $\tau_{imp}$ is the total effective lifetime measured in the implanted sample M1. Since the value of $G_{pump}$ in the undamaged and damaged samples M2 and M1 is the same based on the conditions stated in the description of the conditions necessary for the operation of the procedure, it follows that $\Delta N_{ref}/\tau_{ref}=\Delta N_{imp}/\tau_{imp}$ and it can be seen that the recombination factor assigned to the defects present in the implanted sample M1 is given by the following expression:

$$U_{def} = (U_{Aug,ref} - U_{Aug,imp}) + (U_{SRH,ref} - U_{SRH,imp}) + (\Delta N_{ref} - \Delta N_{imp})/\tau_a \tag{16}$$

Here, the values of $U_{Aug,ref}$, $U_{SRH,ref}$, $\Delta N_{ref}$ for the reference sample M2 are already known from equation (14). Knowing the measured value of $\Delta R/R_0|_{imp}$, substituting $U_{def}$ from equation (16) into equation (15), the value of $\Delta N_{imp}$ for the tested sample M1, then knowing $\sigma_{def}N_{def}$ and $\sigma_{def}$, the value of $N_{def}$, i.e., the required defect concentration can be obtained. It is noted that under the used measurement conditions, SRH recombination is usually negligible, which simplifies the form of equations (14), (15), (16).

The method according to the invention can be advantageously used in the case of MeV energy $H^+$, $He^+$ implantations. In semiconductor technology, the high-energy ~MeV hydrogen ion implantation step is often used. Due to their small mass, hydrogen ions penetrate much deeper into the sample (e.g., silicon) than the traditionally used, larger donor (e.g., phosphorus, arsenic) or acceptor (e.g., boron)

ions. In addition, hydrogen ion implantation produces orders of magnitude smaller defect concentrations than implantation with heavier ions of similar dose and energy. High-energy hydrogen implantation makes it possible to control the conduction properties in deep zones of the Si substrate, even several tens of micrometers below the surface of the sample. With high-energy, low-dose hydrogen implantation, the lifetime of charge carriers can be adjusted, and the switching properties can be improved in various power electronic devices, an example of this can be found in the studies "Local lifetime control by light ion irradiation: impact on blocking capability of power P-i-N diode" by P. Hazdra, K. Brand, J. Rubes, and J. Vobecky, (*Microelectron. J.* 32 (5): 449-456, 2001), or "Multiple proton energy irradiation for improved GTO thyristors" by A. Hallen, M. Bakowski, and M. Lundqvist, (*Solid-State Electronics,* 36/2: 133-141, 1993). With hydrogen implantation in a medium dose range, donor centers can be created and thus buried n-type zones can be formed in complex semiconductor structures, see e.g., the study "Shallow donor state produced by proton bombardment of silicon" by Y. Zohta, Y. Ohmura, and M. Kanazawa, (*J. J. Appl. Phys.* 10 (4): 532, 1971). High-energy hydrogen implantation is a frequently used step in the design of electronic imaging devices, such as C-MOS cameras, which creates defects in small ppb-ppm concentrations in the applied dose ranges of $10^{11}$-$10^{16}$ $cm^{-2}$, typically in the upper 10-100 microns of the sample in the thickness range.

The method according to the invention can also be advantageously used for other high-energy, low-dose implantations and low-dose channeling deep implantations. Here, the method can also be used to check the accuracy of the sample orientation and to determine the cutting plane orientation of the sample precisely, since the penetration depth of the implanted ions can be significantly increased, and the defect concentration caused by them can be greatly reduced by using channeling implantation, see e.g., the study "Modeling of damage accumulation during ion implantation into single-crystalline silicon" by M. Posselt, B. Schmidt, C. S. Murthy, T. Feudel, and K. Suzuki (*J. Electrochem. Soc.* 144:1495, 1997). In this case, the direction of the well-collimated ion beam with low divergence is parallel to one of the crystallographic axes of the semiconductor crystal, e.g., with the crystallographic direction of Si [100] or Si [110]. The implanted ions then carry out a transversal oscillating movement perpendicular to their direction of travel between the parallel atomic rows and atomic planes of the crystal, as a result of which the probability of direct ion-atom collisions decreases and the nuclear and electronic stopping force acting on the ions also decreases. The channel effect plays a significant role below the low, typically 0.1-1% defect concentration ranges, above which the emerging defect centers already block the effect. On the other hand, the measure of the channeling effect is also very sensitive to the precise setting of the sample orientation, typically an inclination of ~0.1-1° of the ion beam with respect to the main crystallographic axis also blocks the effect. The resulting defect concentration thus strongly depends on the dose and direction of the implantation. The presented method is suitable for monitoring the defect concentration and charge carrier lifetime at a fixed dose with a variable tilt/twist angle, or with a variable dose at a fixed tilt/twist angle, typically in the range of ppb-ppm defect concentrations. The described procedure is also suitable for the precise determination of the cutting plane orientation of the base slice, i.e., for the high-precision monitoring of the tilt angle between the sample surface and the given crystallographic direction that typically differs from 90° by ~0.1-1°.

It can be considered as an advantage that the procedure in the range of small defect concentrations can help to monitor the dynamic heat treatment processes during implantation as a function of dose, in the case of high-energy light implantations ($H^+$, $He^+$) and even heavier ones ($B^+$, $P^+$, $As^+$), in the case of channeling implantations (dose-dependent channel blocking effect). This enables more precise planning of the implantation technologies used in the semiconductor industry.

The proposed method can be advantageously used when measuring the concentration of homogeneous O, C pollution, oxygen-crystal defect complexes, or homogeneous metal pollution, and when estimating the relevant lifetimes.

Another advantage is that if the physical material parameters discussed above are known and the appropriate laser wavelengths, laser power and modulation frequency are used for the PMR method, the method can be applied to other semiconductor materials (e.g., silicon carbide (SIC), germanium (Ge), etc.) as well.

The invention claimed is:

1. A method for determining a crystal defect concentration lower than 10 ppm in a semiconductor material based on a photomodulated reflection measurement, comprising:

generating excess charge carriers in a sample of the semiconductor material with a periodically modulated illumination in time;

qualifying an optical reflection modulation (ΔR) caused due to a change in time of the excess charge carriers by an amount of modulation caused in a reflection (R) of a test beam with a constant power over time, by forming a ratio (ΔR/R) of the optical reflection modulation (ΔR) and the measured reflection (R), derived from an obtained ratio of an excess charge carrier concentration formed during the illumination;

determining a total charge carrier lifetime ($\tau_{tot}$) based on the excess charge carrier concentration;

deriving a recombination lifetime ($\tau_{def}$) assigned to crystal defect sites from the total charge carrier lifetime ($\tau_{tot}$); and based on the recombination lifetime ($\tau_{def}$) this, determining the crystal defect concentration.

2. The method according to claim 1, wherein the semiconductor sample is implanted with low-mass ions.

3. The method claim 2, wherein the semiconductor sample is implanted with hydrogen ions or helium ions.

4. The method claim 2, measuring wherein an implantation energy of the low-mass ions is greater than 300 keV.

5. The method claim 2, wherein an implantation dose is between 1e10 1/cm$^2$ and 1e17 1/cm$^2$.

6. The method of claim 1, wherein a greater part of the crystal defect concentration is located at a depth of 100 micrometers from a surface of the sample.

7. The method of claim 1, wherein the crystal defect concentration comprises defects caused by metal impurities in the semiconductor crystal.

8. The method of claim 1, wherein the crystal defect concentration comprises defects caused by oxygen impurity complexes in the semiconductor crystal.

9. The method of claim 1, wherein the semiconductor sample is implanted with non-low-mass ions, in which the following condition is met:

$$R_{las}^2 \ll R_p^2,$$

where $R_{las}$ is a laser spot radius of the pumping and sampling PMR, and $R_p$ is a maximum penetration depth of the implanted ions.

10. The method of claim 1, wherein the semiconductor sample is implanted with non-low-mass ions, the semiconductor sample having a low defect concentration formed as a result of a channel effect due to the implantation conditions used.

11. The method of claim 10, wherein the quotient ΔR/R of the measurement shows a detectable dependence on an inclination angle between a direction of the ion beam and a main crystallographic axes of the sample.

* * * * *